Figure 1:
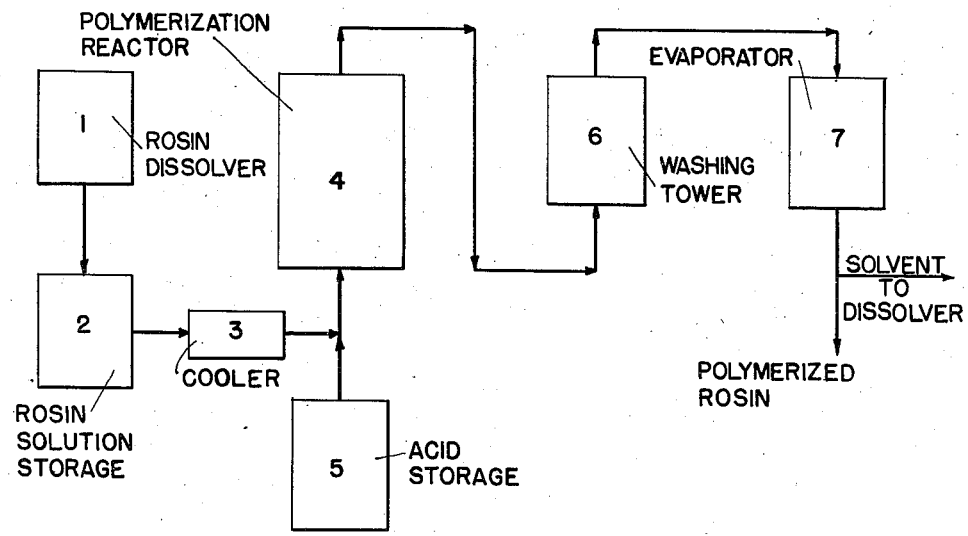
Figure 2:
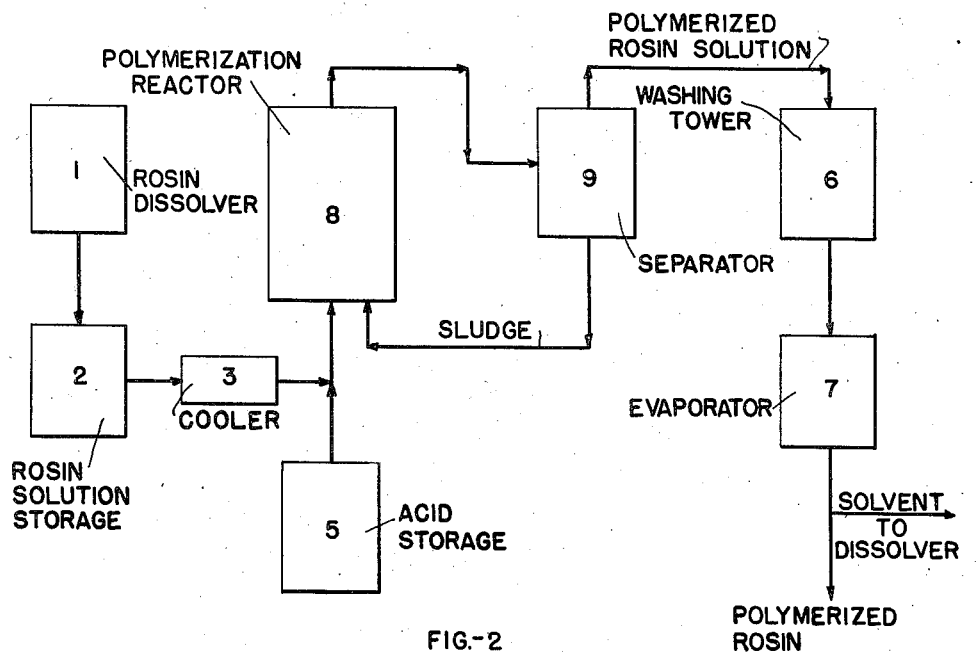

July 7, 1942.   C. E. TYLER   2,288,659
METHOD FOR POLYMERIZATION OF ROSIN
Filed April 10, 1940

CLELL E. TYLER
INVENTOR.

BY Cleveland B. Hallabaugh.

Patented July 7, 1942

2,288,659

UNITED STATES PATENT OFFICE 2,288,659

METHOD FOR POLYMERIZATION OF ROSIN

Clell E. Tyler, Hattiesburg, Miss., assignor to Hercules Powder Company, Wilmington, Del., a corporation of Delaware Application April 10, 1940, Serial No. 328,864

11 Claims. (Cl. 260—97)

This invention relates to an improved method for the polymerization of rosin.

Heretofore rosin has been polymerized with sulfuric acid, for example, by treating the rosin dissolved in a suitable solvent with sulfuric acid. When rosin is treated with sulfuric acid under polymerizing conditions a dark-colored acid sludge is invariably formed consisting presumably of an association product of the polymerized rosin and the sulfuric acid. This sludge usually separates out from the solution during the polymerization process, being insoluble in the rosin solution.

It has been the practice to recover the polymerized rosin by either of two procedures. In one procedure, the reaction mixture has been washed with water to remove the sulfuric acid and to effect decomposition of the acid sludge. Any rosin contained in the acid sludge then redissolved in the solvent. The polymerized rosin has then been recovered from its solution by evaporation of the solvent. A disadvantage of this procedure is that a polymerized rosin of much darker color than the original rosin results. By the other procedure the acid sludge has been allowed to separate from the polymerized rosin solution and the polymerized rosin recovered by evaporation of the solvent. A disadvantage of the latter procedure is the low yield of polymerized rosin obtained.

It is an object of this invention to provide a process for polymerized rosin which is a distinct improvement over the procedures heretofore used.

It is a further object of this invention to provide a process for polymerizing rosin which provides a polymerized rosin of substantially the same color as the original rosin or of an improved color and in a substantially quantitative yield based on the original rosin used.

It is a still further object of this invention to provide a continuous process for polymerizing rosin.

These and further objects of the invention will be apparent from the following description.

The above objects may be accomplished in accordance with this invention by utilizing as a polymerization catalyst for rosin the acid sludge which is formed when rosin is treated with sulfuric acid under polymerizing conditions. Treatment of rosin with such an acid sludge effects an improved type of polymerization and makes it possible for the first time to polymerize rosin in a continuous manner. Broadly, the improved process involves contacting a rosin solution with the above acid sludge catalyst, removing a polymerized rosin solution and recovering polymerized rosin from the said solution.

More particularly, the improved process comprises continuously contacting a rosin solution with the acid sludge catalyst in a suitable vessel to effect a polymerization of the rosin, removing the polymerized rosin solution from the polymerizing vessel continuously and recovering polymerized rosin. The polymerized rosin is thereby obtained in a yield substantially equal in amount to the rosin used and the polymerized rosin has a color substantially no darker than the original rosin.

In the accompanying drawing two procedures for carrying out the process of this invention are illustrated.

Figure I is a flow sheet illustrating one method of carrying out the continuous polymerization of rosin.

Figure II is a flow sheet illustrating a slightly modified procedure of carrying out the continuous polymerization of rosin.

The acid sludge which I employ as a polymerization catalyst is prepared by treating rosin dissolved in a suitable solvent with sulfuric acid of suitable strength under polymerizing conditions and is the incompatible layer which separates from the rosin solution. I believe the sludge contains an association product of polymerized rosin and sulfuric acid which acts as the effective catalytic material. The sulfuric acid used in preparing the acid sludge catalyst may vary within the range from about 65% to about 102%, and preferably will be within the range from about 85% to about 100%. The amount of sulfuric acid used may be within the range of about 5% to about 200% by weight of the rosin and preferably will be within the range of about 25% to about 50% by weight based on the rosin.

The acid sludge catalyst does not increase perceptibly in amount as rosin is brought into contact with it. It, therefore, appears that the acid sludge exerts the polymerizing effect on the rosin. The rosin solution carries approximately 0.5 to 1 per cent, based on its weight, of sulfuric acid out of the acid sludge catalyst. It is desirable, therefore, to add a small amount of sulfuric acid to the acid sludge catalyst from time to time to compensate for this loss by entrainment. It will be appreciated that the small amount of sulfuric acid added in this manner merely replaces the sulfuric acid lost from the acid sludge by entrainment and serves to maintain the activity of the acid sludge catalyst at approximately its original strength. When the catalyst becomes reduced in catalytic activity it may be replaced with a fresh acid sludge with little difficulty. When the acid sludge catalyst is removed from the polymerization vessel and is replaced by fresh catalyst a small amount of rosin is lost in the catalyst removed. This loss constitutes the only loss of rosin in the process and is usually well below 5 per cent of the total rosin treated. It may be recovered from the catalyst, if desired. Thus, the yield of polymerized rosin in the process is above 95 per cent and is, therefore, considered to be substantially quantitative.

The rosin treated by the method in accordance with this invention may be any of the various grades of wood or gum rosin. It may have been previously heat treated, distilled or refined by any of the processes known to the art. When treating wood rosin, a rosin is preferred which has been subjected to a refining operation for the removal of color bodies, although unrefined wood rosin may be treated according to this process. Any of the usual grades of gum rosin are well adapted for treatment by this process. Rosins which have been heat treated prior to polymerization will in general give a polymerized rosin of higher melting point than the corresponding rosin not heat treated.

The concentration of rosin in the solution used in the process may vary over the range of about 10% to about 60% by weight and preferably will be within the range of from about 20% to about 40% by weight. Among the solvents for rosin which may be used are coal tar hydrocarbons, as for example, benzol, toluol, xylol; petroleum hydrocarbons, as for example, pentane, hexane, heptane and various gasoline fractions, such as those boiling within the range from about 90° C. to about 175° C.; hydrogenated petroleum solvents, such as those known under the trade name of "Solvesso"; carbon tetrachloride, cyclohexane, paramenthane, etc. Of these solvents, benzol and the gasoline fractions are most preferred.

The temperature at which the polymerizing reaction is carried out may vary from about −10° C. to about 65° C. and preferably will fall within the range of about 0° C. to about 25° C. Above about 25° C. side reactions occur which tend to darken the rosin while at temperatures below about 0° C. long reaction periods are necessary to produce an appreciable increase in the melting point of the rosin.

The process will be described in detail in reference to the flow sheet drawings. Referring to Figure I, there is shown a flow sheet illustrating diagrammatically a plan for carrying out the process. The rosin is first dissolved in dissolver vessel 1 from which the rosin solution is led into vessel 2 where it is stored. From vessel 2 the rosin solution is passed through a jacketed cooler 3 to bring the solution to the temperature desired in the polymerization reaction. A properly proportioned amount of the rosin solution is then led from the vessel 2 through the cooler 3 and into the polymerization reactor 4 equipped with suitable agitating means and also jacketed to permit circulation of a cooling medium through the jacket. Sulfuric acid of 65 to 102% strength in amount within the range of 5 to 200% of the rosin and preferably 25 to 50% of the rosin is then flowed or pumped into the polymerization reactor 4 from the acid storage vessel 5. The combined rosin and sulfuric acid in the polymerization reactor need not necessarily fill the reactor. The rosin and sulfuric acid are then agitated at a temperature within the range of −10° C. to 65° C. and preferably at 0° C. to 25° C. for a period of time to polymerize the rosin and to separate as a subnatant layer the acid sludge, the latter being of considerably higher density than the rosin solution and being incompatible therewith.

The flow of rosin solution from the storage vessel 2 through cooler 3 into the polymerization reactor 4 is then commenced at a definite rate. The rosin preferably enters the bottom of the polymerization reactor and thus comes into intimate contact with the acid sludge catalyst. A continuous flow of polymerized rosin solution then issues from the top of the polymerization reactor at a rate equal to the rate at which the rosin solution is delivered to the bottom of the reactor. Intimate contact of the rosin solution with the acid sludge catalyst is provided by agitation. The agitation is preferably of such a nature as to permit separation of a layer of polymerized rosin solution at the top of the reactor. The rate of delivery of the rosin solution will determine the time of contact with the acid sludge catalyst and will consequently control the degree of polymerization obtained. The flow of rosin solution to the polymerization reactor is continuous and need only be interrupted when the activity of the acid sludge catalyst diminishes and replacement is desirable. To avoid even this interruption, a second reserve polymerization reactor containing fresh acid sludge catalyst may be used when activity of the first catalyst diminishes and the flow of rosin solution transferred to it.

The polymerized rosin solution which flows continuously from the top of the polymerization reactor 4 is passed through a tower 6 where it is washed with water to remove residual sulfuric acid. From the washing tower the solution passes to evaporator 7 where the solvent is removed by distillation. The solvent is passed to dissolver 1 and the polymerized rosin is recovered in any suitable manner.

In Figure II an alternative procedure is illustrated in a flow-sheet drawing. The essential difference in this alternative procedure is that the polymerization reactor 4 of Fig. I is replaced by a form of reactor 8 which will provide very intimate and efficient contact between the acid sludge and the rosin solution in a very short time and will thus accelerate the polymerization reaction. The reactor 8 may be a device such as a high speed "Sharples" mixer, a homogenizer or a turbine mixer such as a "Blaw-Knox" turbine mixer, or a similar device. The reactor is also jacketed for cooling purposes. The intimate mixture of acid sludge catalyst and polymerized rosin solution formed in the reactor 8 is fed continuously to a separating device 9, such as, for example, a centrifuge. Due to the appreciable difference in density between the acid sludge and the polymerized rosin solution a separation is readily obtained. The acid sludge is returned continuously to the polymerization reactor 8 and the polymerized rosin solution passes to the tower 6, as in Fig. I, and is processed as in the first procedure.

A more detailed description of the invention may be found in the following specific examples.

EXAMPLE 1

One thousand parts by weight of a 25% by weight solution of K wood rosin in benzol were flowed into a polymerization reactor consisting of a jacketed vessel having an agitator. The temperature of the rosin solution was 15° C. To this solution 63 parts by weight of 95% sulfuric acid were introduced gradually with agitation into the solution and while passing ice water through the jacket of the reactor to keep the temperature of the reaction mixture at about 15° C. to 18° C. As the sulfuric acid entered the rosin solution a sludge formed and settled at the bottom of the reactor. The addition of sulfuric acid was made over a period of about 20 minutes and thereafter the mixture was agitated for an additional 10 minutes. A continuous flow of a 25% by weight solution of K wood rosin in benzol was then fed into the bottom portion of the reactor at the rate of about 18.5 parts by weight per minute while polymerized rosin solution was withdrawn from the top of the reactor at the same rate. The polymerized rosin solution withdrawn from the polymerization reactor was washed with several portions of water to remove residual sulfuric acid, the solution filtered and the polymerized rosin recovered by evaporation of the solvent. The characteristics of the polymerized rosin obtained at 10 minutes intervals are shown in Table I below, indicating the effectiveness of the acid sludge as a catalyst. The K wood rosin used had a melting point of 81° C. and a Lovibond color of 40 Amber + 1.5 Red.

Table I

| Time in minutes from beginning of continuous feed | Lovibond color | U. S. standard grade | Melting point (drop) |
|---|---|---|---|
|  |  |  | °C. |
| 10 | 40 amber, 0.25 red | M | 90.0 |
| 20 | 40 amber, 0.25 red | M | 94.0 |
| 30 | 40 amber, 1.0 red | K | 92.0 |
| 40 | 40 amber, 1.0 red | K | 92.5 |
| 50 | 40 amber, 1.25 red | K | 93.5 |
| 60 | 40 amber, 1.5 red | K | 92.0 |
| 70 | 40 amber, 1.25 red | K | 92.0 |

EXAMPLE 2

The same procedure as described in Example 1 was repeated with the exception that 5 parts by weight of 95% sulfuric acid were added to the polymerization reactor every 10 minutes after the beginning of the continuous feed of rosin solution was started. The characteristics of the polymerized rosin recovered at 10 minute intervals are shown in Table II below, the K wood rosin having the same characteristics as shown before.

Table II

| Time in minutes from beginning of continuous feed | Lovibond color | U. S. standard grade | Melting point (drop) |
|---|---|---|---|
|  |  |  | °C. |
| 10 | 40 amber, 1.5 red | K | 93.0 |
| 20 | 40 amber, 0.75 red | M | 93.0 |
| 30 | 40 amber, 0.5 red | M | 95.0 |
| 40 | 40 amber, 0.5 red | M | 93.5 |
| 50 | 40 amber, 1.25 red | K | 93.5 |
| 60 | 40 amber, 2.0 red | K | 93.0 |
| 70 | 40 amber, 3.25 red | I | 92.0 |
| 80 | 40 amber, 3.0 red | I | 93.0 |
| 90 | 40 amber, 3.25 red | I | 93.0 |
| 100 | 40 amber, 3.0 red | I | 93.5 |
| 110 | 40 amber, 3.25 red | I | 91.0 |
| 130 | 40 amber, 3.5 red | I | 89.5 |
| 140 | 40 amber, 3.5 red | I | 91.0 |

EXAMPLE 3

The procedure of Example 1 was repeated with use of 1000 parts by weight of a 25% solution of K gum rosin in benzol and with 68 parts by weight of 95% sulfuric acid to prepare the acid sludge catalyst in the polymerization reactor. The procedure was otherwise the same as in Example 1. The polymerized K gum rosin recovered had an average melting point of 103° C.

EXAMPLE 4

The procedure of Example 1 was repeated with K wood rosin with the exception that the rate of feed of the rosin solution to the polymerization reactor containing the acid sludge catalyst was approximately 8.1 parts by weight per minute. The slower feed caused a higher degree of polymerization of the rosin. At intervals of about 30 minutes an additional 5 parts by weight of sulfuric acid were added to the polymerization reactor to compensate for the loss of acid by entrainment from the acid sludge catalyst. The characteristics of the polymerized rosin obtained are set forth in Table III below, each sample representing the yield over a 20 minute period.

Table III

| Sample | Lovibond color | U. S. standard color grade | Melting point (drop) |
|---|---|---|---|
|  |  |  | °C. |
| 1 | 40 amber, 0.25 red | M | 100.5 |
| 2 | 40 amber, 0.25 red | M | 99.5 |
| 3 | 40 amber, 2.0 red | K | 99.0 |
| 4 | 40 amber, 4.0 red | I | 97.0 |
| 5 | 40 amber, 4.5 red | I | 95.0 |
| 6 | 40 amber, 4.25 red | I | 95.0 |
| 7 | 40 amber, 2.5 red | K | 96.0 |
| Unpolymerized rosin | 40 amber, 1.5 red | K | 81.0 |

EXAMPLE 5

Four hundred and fifty parts by weight of a 25% by weight solution of K wood rosin in gasoline purified by washing several times with 101% sulfuric acid were flowed into a polymerization reactor consisting of a jacketed vessel equipped with agitator. To this solution 37.5 parts by weight of 95% sulfuric acid were introduced gradually with agitation while maintaining the temperature at 15 to 20° C. by means of circulating cooling water in the jacket. An acid sludge layer formed at the bottom of the reactor. A continuous flow of the 25% by weight solution of K wood rosin in gasoline was then fed into the bottom of the reactor at the rate of about 15 parts by weight per minute while polymerized rosin solution was withdrawn from the top of the reactor at the same rate. The polymerized rosin solution obtained was washed with water and the polymerized rosin recovered by evaporation of the solvent. The polymerized rosin obtained had an average melting point of 86.5° C. and a color of 25 Amber. The original K wood rosin had a melting point of 81° C. and a color of 40 Amber+1.5 Red.

EXAMPLE 6

About 70 gallons of a 30 to 33% solution of K wood rosin in benzol were pumped from a storage vessel through a cooler into a polymerization reactor of 85 gallons capacity. With the temperature of the rosin solution at 15 to 17° C. and the agitator in motion sulfuric acid of approximately 97% concentration was introduced into the rosin solution in the reactor in 5 pound portions until a total of 45 pounds had been added, the temperature being maintained at 15 to 18° C. About 40 minutes were required for the addition of the sulfuric acid and the mixture was agitated an additional 50 minutes. A continuous flow of the K wood rosin solution was then pumped from the storage tank through a cooler into the bottom of the polymerization reactor at a rate of 0.45 to 0.65 gallon per minute, which corresponds to about 62 to about 85 pounds of rosin per hour. After the reactor became filled the polymerized rosin solution flowed continuously from the top at a rate equal to the rate of feed to the reactor. At intervals of about 30 minutes about 3 pounds of 97% sulfuric acid were added to compensate for the 0.5 to 1% of sulfuric acid carried out of the reactor by entrainment in the polymerized rosin solution. The reactor was approximately one-third full of the acid sludge catalyst. The polymerized rosin solution was washed to remove sulfuric acid and the solvent evaporated for the recovery of the polymerized rosin. At approximately 8 hour intervals the flow of rosin was interrupted and about 100 pounds of the acid sludge catalyst dropped out of the reactor and about 10 pounds of sulfuric acid introduced. After agitating for 15 to 30 minutes the flow of rosin was again resumed. The average analysis of the polymerized rosin in a run of approximately 4 days duration was melting point 100° C. and color 40 Amber + 1.5 Red.

It will be obvious from the above examples and description that the acid sludge catalyst formed by treating rosin with sulfuric acid is very effective and efficient in the polymerization of rosin according to the process of this invention. The improved process makes it possible to obtain polymerized rosin with very little loss in yield of rosin and of a color equal to or better than the original rosin. Furthermore, the improved process is continuous whereas all prior procedures have been incapable of adaptation to a continuous operation.

The polymerized rosin obtained in accordance with the process of this invention may be further improved in color in any way desired. Thus, for example, it may be refined by treatment with nascent hydrogen, for example, according to the procedure described in an application Serial No. 328,865, filed April 10, 1940, by William N. Traylor and Clell E. Tyler. Again, it may be subjected to a heat treatment, for example about 250° C., to volatilize the traces of sulfur impurity present, if desired.

It will be appreciated that the details and examples set forth in the above are illustrative only, and that the invention as broadly described and claimed is in no way limited thereby.

What I claim and desire to protect by Letters Patent is:

1. A process of polymerizing rosin which includes contacting rosin dissolved in a suitable solvent at a temperature within the range of about −10° C. to about 65° C. with a separately prepared catalyst comprising the acid sludge formed by treatment of rosin with sulfuric acid under conditions of reaction adapted to effect polymerization of the rosin, said rosin solvent having substantially no solvent action on the said acid sludge, removing polymerized rosin solution and recovering polymerized rosin from the said solution.

2. A process of polymerizing rosin which includes contacting rosin dissolved in a suitable solvent at a temperature within the range of about −10° C. to about 65° C. with a separately prepared catalyst comprising the acid sludge formed by treatment of rosin with sulfuric acid of a concentration within the range of about 65 per cent to about 102 per cent and in an amount within the range of about 5 per cent to about 200 per cent by weight of the rosin under conditions of reaction adapted to effect polymerization of the rosin, said rosin solvent having substantially no solvent action on the said acid sludge, removing polymerized rosin solution and recovering polymerized rosin from the said solution.

3. A process of polymerizing rosin which includes contacting rosin dissolved in a suitable solvent at a temperature within the range of about −10° C. to about 65° C. with a separately prepared catalyst comprising the acid sludge formed by treatment of rosin with sulfuric acid of a concentration within the range of about 85 per cent to about 100 per cent and in an amount within the range of about 25 per cent to about 50 per cent by weight of the rosin under conditions of reaction adapted to effect polymerization of the rosin, said rosin solvent having substantially no solvent action on the said acid sludge, removing polymerized rosin solution and recovering polymerized rosin from the said solution.

4. A process of polymerizing rosin which includes contacting rosin dissolved in a suitable solvent at a temperature within the range of about 0° C. to about 25° C. with a separately prepared catalyst comprising the acid sludge formed by treatment of rosin with sulfuric acid of a concentration within the range of about 65 per cent to about 102 per cent and in an amount within the range of about 5 per cent to about 200 per cent by weight of the rosin under conditions of reaction adapted to effect polymerization of the rosin, said rosin solvent having substantially no solvent action on the said acid sludge, removing polymerized rosin solution and recovering polymerized rosin from the said solution.

5. A process of polymerizing rosin which includes contacting a solution of rosin in a suitable solvent containing about 10 per cent to about 60 per cent by weight of rosin at a temperature within the range of about −10° C. to about 65° C. with a separately prepared catalyst comprising the acid sludge formed by treatment of rosin with sulfuric acid of a concentration within the range of about 65 per cent to about 102 per cent and in an amount within the range of about 5 per cent to about 200 per cent by weight of the rosin under conditions of reaction adapted to effect polymerization of the rosin, said rosin solvent having substantially no solvent action on the said acid sludge, removing polymerized rosin solution and recovering polymerized rosin from the said solution.

6. A process of polymerizing rosin which includes contacting a solution of rosin in a suitable solvent containing about 20 per cent to about 40 per cent by weight of rosin at a temperature within the range of about −10° C. to about 65° C. with a separately prepared catalyst comprising the acid sludge formed by treatment of rosin with sulfuric acid of a concentration within the range of about 65 per cent to about 102 per cent and in an amount within the range of about 5 per cent to about 200 per cent by weight of the rosin under conditions of reaction adapted to effect polymerization of the rosin, said rosin solvent having substantially no solvent action on the said acid sludge, removing polymerized rosin solution and recovering polymerized rosin from the said solution.

7. A process of polymerizing rosin which includes contacting a solution of rosin in a suitable solvent containing about 20 per cent to about 40 per cent by weight of rosin at a temperature within the range of about 0° C. to about 25° C. with a separately prepared catalyst comprising the acid sludge formed by treatment of rosin with sulfuric acid of a concentration within the range of about 85 per cent to about 100 per cent and in an amount within the range of about 25 per cent to about 50 per cent by weight of the rosin under conditions of reaction adapted to effect polymerization of the rosin, said rosin solvent having substantially no solvent action on the said acid sludge, removing polymerized rosin solution and recovering polymerized rosin from the said solution.

8. A process of polymerizing rosin which includes contacting a solution of rosin in benzol containing about 20 per cent to about 40 per cent by weight of rosin at a temperature within the range of about 0° C. to about 25° C. with a separately prepared catalyst comprising the acid sludge formed by treatment of rosin with sulfuric acid of a concentration within the range of about 85 per cent to about 100 per cent and in an amount within the range of about 25 per cent to about 50 per cent by weight of the rosin under conditions of reaction adapted to effect polymerization of the rosin, said benzol having substantially no solvent action on the said acid sludge, removing polymerized rosin solution and recovering polymerized rosin from the said solution.

9. A continuous process of polymerizing rosin which includes continuously contacting a solution of rosin in a suitable solvent at a temperature within the range of about −10° C. to about 65° C. with a separately prepared catalyst comprising the acid sludge formed by treatment of rosin with sulfuric acid of a concentration within the range of about 65 per cent to about 102 per cent and in an amount within the range of about 5 per cent to about 200 per cent by weight of the rosin under conditions of reaction adapted to effect polymerization of the rosin, said rosin solvent having substantially no solvent action on the said acid sludge, removing polymerized rosin solution continuously from the catalyst and recovering polymerized rosin from the said solution in a yield substantially equal in amount to the rosin treated.

10. A continuous process of polymerizing rosin which includes continuously contacting a solution of rosin in a suitable solvent at a temperature within the range of about −10° C. to about 65° C. with a separately prepared catalyst comprising the acid sludge formed by treatment of rosin with sulfuric acid of a concentration within the range of about 85 per cent to about 100 per cent and in an amount within the range of about 25 per cent to about 50 per cent by weight of the rosin under conditions of reaction adapted to effect polymerization of the rosin, said rosin solvent having substantially no solvent action on the said acid sludge, removing polymerized rosin solution continuously from the catalyst and recovering polymerized rosin from the said solution in a yield substantially equal in amount to the rosin treated and having a color no darker than the rosin treated.

11. A continuous process of polymerizing rosin which include continuously contacting a solution of rosin in a suitable solvent containing about 10 per cent to about 60 per cent by weight of rosin at a temperature within the range of about −10° C. to about 65° C. with a separately prepared catalyst comprising the acid sludge formed by treatment of rosin with sulfuric acid of a concentration within the range of about 65 per cent to about 102 per cent and in an amount within the range of about 5 per cent to about 200 per cent by weight of the rosin under conditions of reaction adapted to effect polymerization of the rosin, said rosin solvent having substantially no solvent action on the said acid sludge, removing polymerized rosin solution continuously from the catalyst, washing said solution to remove residual acid and evaporating the solvent to recover polymerized rosin in a yield substantially equal in amount to the rosin treated and having a color no darker than the rosin treated.

CLELL E. TYLER.

CERTIFICATE OF CORRECTION.

Patent No. 2,288,659. July 7, 1942.

CLELL E. TYLER.

It is hereby certified that error appears in the printed specification of the above numbered patent requiring correction as follows: Page 5, second column, line 45, after the word and period "treated." insert the following as claim 12:

> --A continuous process of polymerizing rosin which includes continuously contacting a solution of rosin in a suitable solvent containing about 20 per cent to about 40 per cent by weight of rosin at a temperature within the range of about 0° C. to about 25° C. with a separately prepared catalyst comprising the acid sludge formed by treatment of rosin with sulfuric acid of a concentration within the range of about 85 per cent to about 100 per cent and in an amount within the range of about 25 per cent to about 50 per cent by weight of the rosin under conditions of reaction adapted to effect polymerization of the rosin, said rosin solvent having substantially no solvent action on the said acid sludge, removing polymerized rosin solution continuously from the catalyst, washing said solution to remove residual acid and evaporating the solvent to recover polymerized rosin in a yield substantially equal in amount to the rosin treated and having a color no darker than the rosin treated.-- in the heading to the printed specification, line 8, for "11 Claims." read --12 Claims.--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.